US009741117B2

(12) United States Patent
Richards et al.

(10) Patent No.: US 9,741,117 B2
(45) Date of Patent: Aug. 22, 2017

(54) MULTIPLE CAMERA APPARATUS AND METHOD FOR SYNCHRONIZED AUTO WHITE BALANCE

(71) Applicant: Motorola Mobility LLC, Chicago, IL (US)

(72) Inventors: By-Her W Richards, Lincolnshire, IL (US); Sean C Kelly, Barrington, IL (US); Kevin W Johnson, Mundelein, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/579,111

(22) Filed: Dec. 22, 2014

(65) Prior Publication Data

US 2016/0182874 A1    Jun. 23, 2016

(51) Int. Cl.
  *H04N 17/00* (2006.01)
  *G06T 7/00* (2017.01)
  *H04N 9/73* (2006.01)
  *H04N 5/247* (2006.01)
  *H04N 5/262* (2006.01)

(52) U.S. Cl.
  CPC ........... *G06T 7/0018* (2013.01); *H04N 5/247* (2013.01); *H04N 5/2624* (2013.01); *H04N 9/735* (2013.01); *H04N 17/002* (2013.01)

(58) Field of Classification Search
  CPC ...... H04N 17/002; H04N 5/217; H04N 9/735; H04N 9/045; H04N 5/247; H04N 5/2624; G06T 7/0018
  USPC .............................................. 348/187, 223.1
  See application file for complete search history.

(56) References Cited

U.S. PATENT DOCUMENTS

| 4,626,893 A * | 12/1986 | Yamanaka | H04N 9/735 348/176 |
| 8,754,941 B1 | 6/2014 | Sarwari | |
| 8,786,729 B2 * | 7/2014 | Peng | H04N 9/735 348/222.1 |

(Continued)

FOREIGN PATENT DOCUMENTS

DE    102012025580 A1    6/2014

OTHER PUBLICATIONS

George Matthews, "Combined Search and Examination Report under Sections 17 and 18(3)", Application No. GB1521715.1, UK Intellectual Property Office, May 5, 2016.

*Primary Examiner* — Michael Lee
(74) *Attorney, Agent, or Firm* — Matthew C. Loppnow; Watson Intellectual Property Group

(57) ABSTRACT

An apparatus includes a plurality of camera units where each camera unit has a lens, a sensor that can detect at least three colors, and camera unit calibration data for each camera unit is stored in non-volatile, non-transitory memory. The apparatus also includes multi-camera auto white balance synchronization logic that is operatively coupled to each camera unit. The multi-camera auto white balance synchronization logic is operative to determine common white balance results based on the camera unit white balance results per frame and the camera calibration data. The common white balance results are provided to image signal processing pipelines such that a merged frame can be obtained by combining the frames of each camera after performing white balance and color correction using the common white balance results.

20 Claims, 6 Drawing Sheets

(56) References Cited

U.S. PATENT DOCUMENTS

| | | | | |
|---|---|---|---|---|
| 2005/0007463 A1* | 1/2005 | Xia | ................ | H04N 9/735 |
| | | | | 348/223.1 |
| 2007/0285282 A1 | 12/2007 | Nakayama | | |
| 2009/0147100 A1* | 6/2009 | Nagamasa | ............ | H04N 5/222 |
| | | | | 348/223.1 |
| 2009/0290029 A1* | 11/2009 | Li | ................ | G06T 7/2013 |
| | | | | 348/208.4 |
| 2014/0375759 A1* | 12/2014 | Mikes | ............... | H04N 5/23238 |
| | | | | 348/36 |

* cited by examiner

MULTIPLE CAMERA APPARATUS AND METHOD FOR SYNCHRONIZED AUTO WHITE BALANCE

FIELD OF THE DISCLOSURE

The present disclosure relates generally to imaging devices such as digital cameras and more particularly to methods and apparatuses for auto white balance of imaging device.

BACKGROUND

Imaging devices such as digital cameras perform auto white balance operations to identify the light source at scene, to white balance the image areas of neutral gray objects, and to correct color of the image areas of colorful objects. For a given imaging device, calibration is utilized to account for part to part variation within the imaging system. For color calibration or white balance calibration, measured data is collected under known light sources such that frames captured by the imaging device can be compared to a reference point. The calibration data can be used to make white balance adjustments, color rendering adjustments or both.

DETAILED DESCRIPTION

Figure 1:
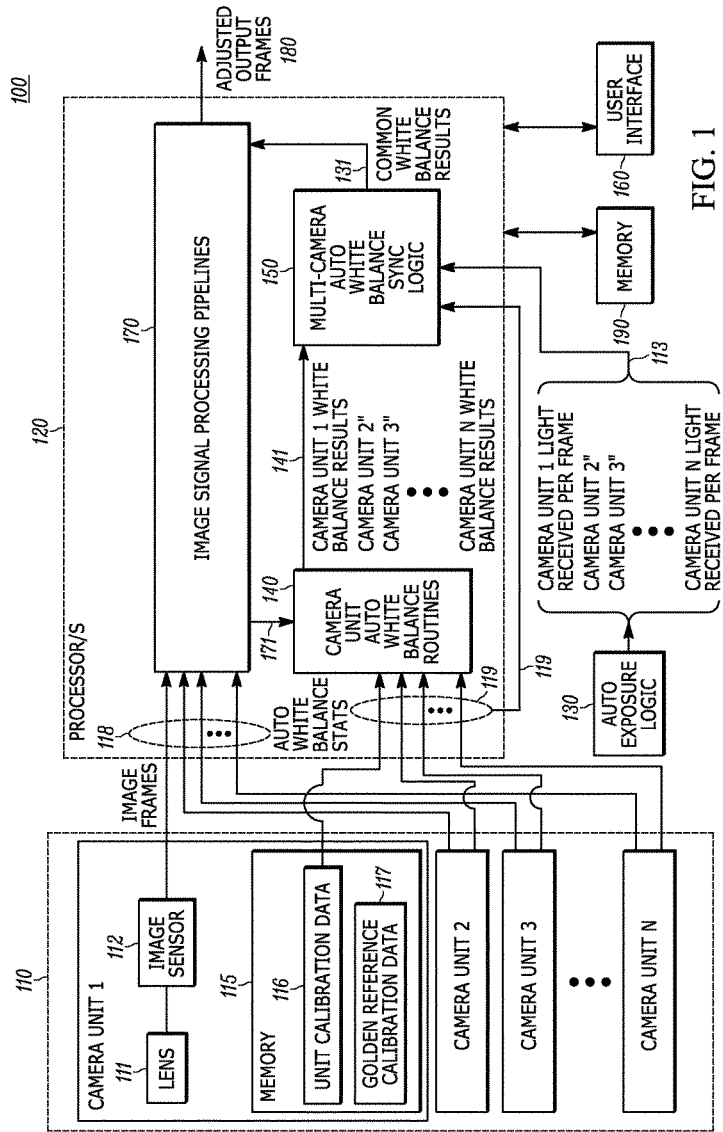
FIG. 1 is a block diagram of an apparatus with multiple camera units and auto white balance logic in accordance with an embodiment.

Briefly, the disclosed embodiments reduce color blotchiness and other color inconsistencies for images produced using multiple camera units. More particularly, the present disclosure provides apparatuses and methods for performing auto white balance for multiple image frames captured by multiple camera units. The disclosed apparatuses and methods enable consistency in white balance and color correction of each frame captured by various camera units such that a merged image may be created from the frames.

One disclosed embodiment provides an apparatus that includes a plurality of camera units. Each camera unit includes a lens, an image sensor that can detect at least three colors. The apparatus also includes camera unit calibration data for each camera unit stored in non-volatile, non-transitory memory. Multi-camera auto white balance synchronization logic is operatively coupled to each camera unit and is operative to determine common white balance results for the plurality of camera units based on camera unit white balance results per frame of each camera unit and the camera unit calibration data. The multi-camera auto white balance synchronization logic provides white balance and color correction to one or more frames such that a merged frame can be obtained by combining the frames of each camera unit.

Another disclosed apparatus includes a plurality of camera units where each camera unit includes a lens, a sensor operative to detect at least three colors and non-volatile, non-transitory memory storing camera unit calibration data. The apparatus also includes at least one processor that is operative to determine camera unit white balance results for each camera unit of the plurality of camera units, and multi-camera auto white balance synchronization logic that is operatively coupled to each camera unit and to the at least one processor. The multi-camera auto white balance synchronization logic is operative to apply confidence levels to the unit calibration data of each camera unit, apply confidence levels to the camera unit white balance results for each camera unit of the plurality of camera units, and select one camera unit's white balance results, excluding any camera-unit-specific results, as a common white balance result to adjust white balance gains and color correction matrices for the plurality of camera units.

The apparatus may further include statistical distribution information for unit calibration data stored in non-volatile, non-transitory memory such that the multi-camera auto white balance synchronization logic is operative to apply confidence levels to the unit calibration data of each camera unit using the statistical distribution information for unit calibration data. The multi-camera auto white balance synchronization logic may select white balance gain correction factors for each camera unit of the plurality of camera units, based on common white balance results. The at least one processor may adjust a plurality of white balance gain determinations using the white balance gain correction factors for each camera unit of the plurality of camera units.

Another aspect of the present disclosure is a method that includes two steps: (1) Camera unit auto white balance routines obtain statistics from frames of each camera unit of a plurality of camera units where each frame comprises at least three colors, determining camera unit white balance results based on the statistics and camera unit calibration data for each camera unit of the plurality of camera unit; (2) Multi-camera auto white balance synchronization logic determines common white balance results from camera unit white balance results of multiple cameras, and produces a merged frame by combining the frames of each camera after white balance and color correction of each frame using the common white balance results.

The method may further include outputting, by a plurality of image processing pipelines, a white balanced and color corrected frame based on the common white balance results. In some embodiments, the method may include assigning a first confidence level to the camera unit white balance results of each camera unit and calculating a weighted confidence level for the camera unit white balance results for each camera unit. The method may further include determining a second confidence level for each frame captured by each camera unit based on light received by each camera unit in capturing the frame, and performing white balancing and color correction for each frame of each camera unit using the statistics to generate camera unit white balance results with the second confidence level for each frame of each camera unit.

In some embodiments, the method may include selecting the camera unit white balance results with the highest confidence level where the camera unit white balance results are for a first camera unit of the plurality of camera units, and providing common white balance results to the image processing pipeline of every other camera unit other than the first camera unit. The method may further include calculating the weighted confidence level for the camera unit white balance results for each camera unit wherein the weighted confidence level is increased based on field-of-view or lens aperture.

In some embodiments, the method may include determining overlapping regions of the image for each frame captured by each camera unit and collecting statistics only for the overlapping regions of each frame. The method may use alignment calibration of the camera units to determine coordinates for obtaining statistics for overlapping regions of each frame.

Turning now to the drawings, FIG. 1 is a block diagram of an apparatus 100 with multiple camera units and multi-camera AWB synchronization logic 150 in accordance with an embodiment. The apparatus 100 includes a group of camera units 110 (also referred to herein as "cameras"), with camera unit 1 through an n-th camera unit "N", which are each operatively coupled to a group of image signal processing pipelines 170. The image signal processing pipelines 170 may be implemented as software (i.e. executable code) that is executed on one or more processors 120 or may be implemented as hardware, or as a combination of hardware and software/firmware. The camera units are operative to capture and provide image frames 118 to the image signal processing pipelines 170. Camera unit 1 shows example details of components that are present in each of the camera units of camera units 110. As shown for camera unit 1, each camera unit includes at least a lens 111, an image sensor 112 that can detect at least three colors, and memory 115. The memory 115 is non-volatile, non-transitory memory and contains camera unit calibration data 116 and golden reference calibration data 117 (also referred to herein as "classic" calibration data.) The camera unit calibration data 116 includes white balance calibration data for the camera unit collected with respect to a reference such as a calibrated white card reference. Some of the camera units 110 may have identical specifications however each camera unit may be unique or may have some different characteristic. For example, in some embodiments, different camera unit lenses may have different field-of-view (FOV). In one example embodiment, a first camera unit lens may have a wide FOV and a second camera lens may have a narrow FOV with respect to the first camera FOV.

The terms "wide" and "narrow" as used herein are relative terms that are to be construed such that one of the cameras exhibits a "wider" or "narrower" FOV with respect to the some other of the cameras by comparison. More particularly, a camera described herein as having a "narrow" FOV is herein considered as exhibiting a "narrower" FOV than another camera in a multi-camera apparatus. Likewise, a camera described herein as having a "wide" FOV is herein considered as exhibiting a "wider" FOV than another camera in a multi-camera apparatus.

The apparatus 100 includes multi-camera AWB synchronization logic 150 that is operatively coupled to the image signal processing pipelines 170 and to camera unit auto white balance (AWB) routines 140. As discussed with respect to the image signal processing pipelines 170, likewise in some embodiments, the multi-camera AWB synchronization logic 150 and/or the camera unit AWB routines 140 may be implemented as executable instructions executed by the one or more processors 120, or may be implemented as hardware, or as a combination of hardware and software/firmware. In embodiments in which one or more of these components is implemented as software, or partially in software/firmware, the executable instructions may be stored in operatively coupled, non-volatile, non-transitory memory 190, that may be accessed by the one or more processors 120 as needed. The memory 190 may be operatively coupled to the one or more processors 120 as shown, may be integrated therewith, or may be some combination of operatively coupled memory and integrated memory. The memory 190 may store, among other things, operating system executable code to run at least one operating system, as well as executable code for the image signal processing pipelines 170, the multi-camera AWB synchronization logic 150 and/or camera unit AWB routines 140.

The camera unit AWB routines 140 are operative to obtain auto white balance statistics 171 from the image signal processing pipelines 170, and to provide individual camera unit white balance results 141 as output. The individual camera unit white balance results 141 are provided as input to the multi-camera AWB synchronization logic 150, along with each camera's unit calibration data 119 and light received per frame 113 for each camera unit. The light received per frame is provided by camera unit auto-exposure logic 130 which is operative to determine the light received per frame by each camera unit of the group of camera units 110.

The multi-camera AWB synchronization logic 150 is operative to determine common white balance results 131 which may include, but are not limited to, common correlated color temperature at the scene, the light source at the scene, an indication of whether the scene is indoor or outdoor, an indication of low light, or non-low light at the scene, the LED settings used if the camera unit is set to Flash-ON mode, or etc. The common white balance results 131 may be provided as input to one or more components of the image signal processing pipelines 170.

In some embodiments, the multi-camera AWB synchronization logic 150 may be integrated with the camera unit AWB routines 140 as a single integrated logic component. The camera unit AWB routines 140 determine the light source at the scene for each camera unit based on the auto white balance statistics 171 and the camera unit calibration data 119 of each camera unit. The camera unit auto white balance routines 140 output camera unit white balance results 141 for each of the camera units and provides these results to the operatively coupled multi-camera AWB synchronization logic 150. The multi-camera AWB synchronization logic 150 receives the camera unit calibration data 119, and light received per frame data 113 from each camera unit in addition to the camera unit white balance results 141. The light received per frame may be obtained from camera unit auto-exposure logic 130. The multi-camera AWB synchronization logic 150 may determine and apply various weightings to the individual camera unit white balance results 141 in order to determine the common white balance results 131.

That is, the multi-camera AWB synchronization logic 150 may select one of the camera unit white balance results 141, excluding any camera-unit-specific results, as the common white balance results 131 through use of a voting mechanism that is described further herein below. The apparatus 100 may also include a user interface 160 that is operatively coupled to the one or more processors 120 to enable a user to capture an image using the apparatus 100 and to store the image in memory 190 or in another memory component such as a removable memory card.

It is to be understood that any of the above described example components in the example apparatus 100 may be implemented as software (i.e. executable instructions or executable code) or firmware (or a combination of software and firmware) executing on one or more processors, or using ASICs (application-specific-integrated-circuits), DSPs (digital signal processors), hardwired circuitry (logic circuitry), state machines, FPGAs (field programmable gate arrays) or combinations thereof. Therefore the apparatus 100 illustrated in FIG. 1 and described herein provides just one example of a multi-camera apparatus embodiment and is not to be construed as a limitation on the various other possible implementations that may be used in accordance with the various embodiments.

More particularly, the multi-camera AWB synchronization logic 150 may be a single component or may be implemented as any combination of DSPs, ASICs, FPGAs, CPUs running executable instructions, hardwired circuitry, state machines, etc., without limitation. Therefore, as one example, the multi-camera AWB synchronization logic 150 may be implemented using an ASIC or an FPGA that may be operatively coupled to the group of camera units 110 and/or to the image signal processing pipelines 170. Likewise the camera unit auto white balance routines 140 may be executed as code or may be implemented using an ASIC or an FPGA operatively coupled to the group of camera units 110 and/or to the image signal processing pipelines 170 where the multi-camera AWB synchronization logic 150 is also implemented using an ASIC or an FPGA. In another example, the multi-camera AWB synchronization logic 150 and/or the camera unit auto white balance routines 140 may be separate or integrated together, and may be a combination of hardware, and software or firmware executed by a processor such as, but not limited to, one or more processors 120. These example embodiments and other embodiments are contemplated by the present disclosure.

The camera unit auto white balance routines 140 are operative to obtain auto white balance statistics data 171 from one or more pipelines of the image signal processing pipelines 170, and to determine average values per color channel values for grid blocks of the image data. That is, the image signal processing pipelines 170 may divide an image frame into a grid consisting of two or more blocks. A "color channel" as used herein refers to an individual color channel for a color image created using a given color model. In one example, the image signal processing pipelines 170 determines averages for a red, green and blue channel for an RGB image frame. In some embodiments, each color channel of the image frame may be partitioned into a grid and the averages may be then be collected per grid block of each color channel. For example the image signal processing pipelines 170 gathers the averages per color channel for grid blocks of a predetermined grid size on a frame-by-frame basis as captured by each camera unit of the group of camera units 110. These statistics may then be stored in memory 190 for further access by the camera unit auto white balance routines 140. Although the above example, and other examples provided herein, refer to an RGB color model, it is to be understood that any color model may be used in accordance with the embodiments such as RGB, RGBy, CMYK, HSV, HSL or some other color model.

The multi-camera AWB synchronization logic 150 is operatively coupled to each of the camera units 110 and is operative to obtain the stored white balance calibration data from each of the camera's unit calibration data 116 stored in the camera unit's memory 115. The multi-camera AWB synchronization logic 150 outputs common white balance results 131 that are provided as an input to one or more components of the image signal processing pipelines 170. The image signal processing pipelines 170 use the common white balance results 131 to produce adjusted output frames 180. The adjusted output frames 180 synchronize the frame white balance and color from each camera unit such that an image may be produced by the group of camera units 110 having unified white balance and color rendering. In other words, the adjusted output frames 180 are corrected for white balance and color performance differences between the various camera units.

Although the example apparatus 100 shows the camera unit calibration data 116 stored in memory 115 which is a component of each individual camera unit, the camera calibration data 116 for each camera unit may also be stored in memory 190. In other words, camera unit calibration data 116 may be stored in memory that may be either a separate memory component that is for example operatively coupled to the one or more processors 120, or may be stored in memory that is integrated with the camera units or with some other component of the apparatus 100.

The camera unit calibration data 116 is specific to the camera unit and is determined in the factory during the camera unit production cycle. The golden reference calibration data 117 (also referred to herein as "classic" calibration data) is specific to the model of the camera unit and is related to a "golden reference unit." More particularly, if the unit calibration data 116 for a given camera unit becomes corrupted, the classic calibration data may be used as a substitute.

Regardless of where the camera unit calibration data 116 (which includes white balance calibration data) is stored in the apparatus 100, the multi-camera AWB synchronization logic 150 is operative to access it, along with the individual camera unit white balance results 141 and light receive per frame 113, and to use this information to determine the common white balance results 131 provided to the image signal processing pipelines 170. Details of operation of one embodiment having two camera units are illustrated in FIG. 2.

Figure 2:
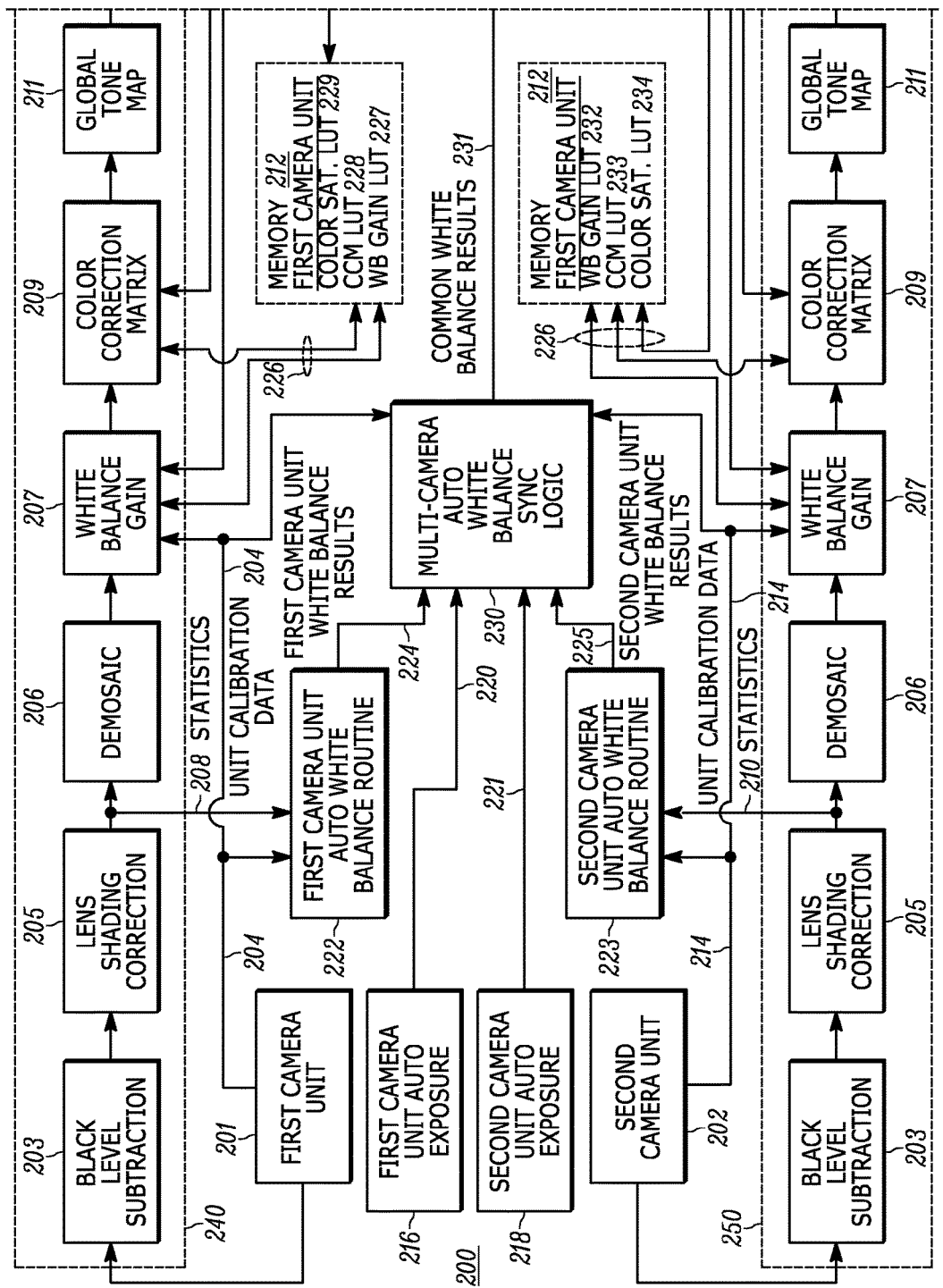
FIG. 2 is block diagram of an apparatus with a dual-camera image signal processing pipeline and auto white balance logic in accordance with an embodiment.
Figure 2:
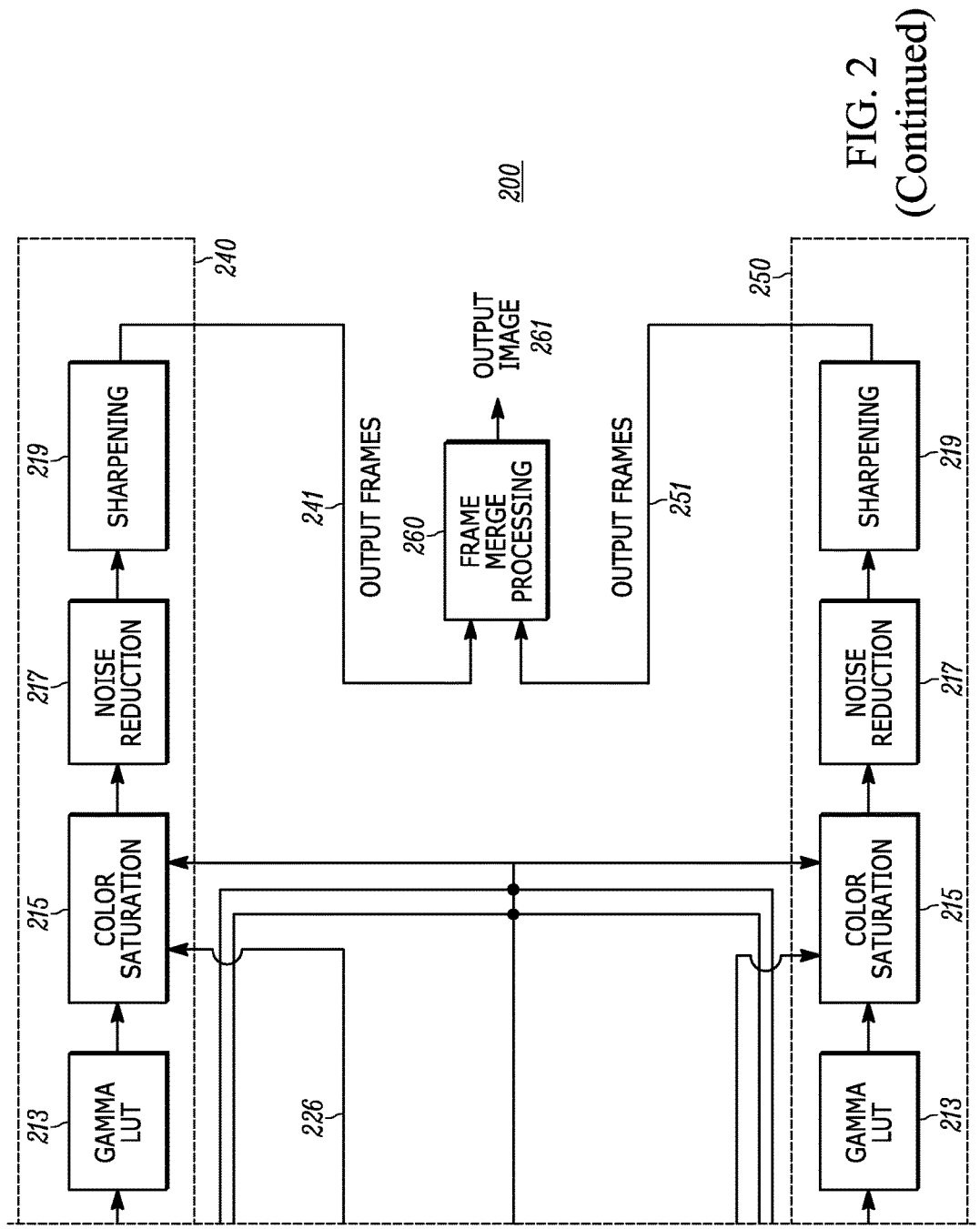

FIG. 2 is block diagram of another example apparatus 200 with a dual-camera image signal processing pipeline and multi-camera AWB synchronization logic 230 in accordance with an embodiment. The multi-camera AWB synchronization logic 230 may be integrated with a component that performs camera unit auto white balance routines in some embodiments or may be a separate component as shown. The example apparatus 200 includes a first camera unit 201 and a second camera unit 202. Both the first camera unit 201 and second camera unit 202 include the internal components shown for example camera unit 1 in FIG. 1. The first camera unit 201 is operatively coupled to a first image processing pipeline 240 while the second camera unit 202 is operatively coupled to the second image processing pipeline 250. In the example embodiment of FIG. 2, the first image processing pipeline 240 and the second image processing pipeline 250 may be implemented in software or firmware, in hardware or in a combination of hardware and software. Each of the first camera unit 201 and the second camera unit 202 output raw image data to their respective image processing pipelines and provide their respective unit calibration data 204, 214 to their respective first camera unit auto white balance routine 222 and second camera unit auto white balance routine 223. The first camera unit calibration data 204 and second camera unit calibration data 214 is also an input to the multi-camera AWB synchronization logic 230. The first image processing pipeline 240 and the second image processing pipeline 250 each include black level subtraction 203, lens shading correction 205, demosaic 206, white balance gain 207, color correction matrix 209, global tone map 211, a gamma lookup table (LUT) 213, a color saturation 215 component, noise reduction 217 and sharpening 219 components. The two image processing pipelines produce respective first output frame 241 and second output frame 251 that are provided to frame merge processing 260 that may, among other things, cause an output image 261 to be displayed on a display, stored in memory, or subjected to further image processing within the apparatus 200.

The first camera unit AWB routine 222 is operatively coupled to the first image processing pipeline 240 after the lens shading correction 205 component to obtain statistics 208 related to the first camera unit 201. In a second operation which may be performed as a parallel operation in some embodiments, the second camera unit AWB routine 223 is also operatively coupled to the lens shading correction 205 component of the second image processing pipeline 250 to obtain the statistics 210 related to an image frame captured by the second camera unit 202. Although the example of FIG. 2 shows the statistics 208, 210 being obtained after the lens shading correction 205 component, it is to be understood that the statistics can be gathered at any location in the pipelines prior to the white balance gain 207 depending on the pipeline design. The first camera unit AWB routine 222 utilizes the first camera unit calibration data 204, and the first camera unit's statistics 208 to generate the first camera unit white balance results 224. The second camera unit AWB routine 223 utilizes the second camera unit calibration data 214, and the second camera unit's statistics 210 to generate the second camera unit white balance results 225. The multi-camera AWB synchronization logic 230 utilizes, and is operative to receive, the first camera unit 201 unit calibration data 204, the second camera unit 202 unit calibration data 214, the first camera unit's light received at the scene per frame 220 (obtained from the first camera unit auto-exposure 216), the second camera unit's light received at the scene per frame 221 (obtained from the second camera unit auto-exposure 218), first camera unit white balance results 224 from the first camera unit auto white balance routine 222, and second camera unit white balance results 225 from the second camera unit auto white balance routine 223. The multi-camera AWB synchronization logic 230 processes these inputs to produce the common white balance results 231 as output. The common white balance results 231 can be used by the first image processing pipeline 240 and the second imaging processing pipeline 250 to adjust the white balance gain 207, adjust the color saturation 215 and adjust the color correction matrix 209. The image processing pipelines 240, 250 may then provide color corrected output frames 241, 251 that may then be used by the frame merge processing 260 to generate a unified frame by combing the frames obtained from each camera and to generate the output image 261. The output image 261 may be stored in memory on the apparatus 200 and/or displayed on a display either of apparatus 200 or on some other apparatus.

The common white balance results 231 may provide scaling factors to the white balance gain 207 components, to accordingly adjust the color temperatures for individual frames being processed by the first image processing pipeline 240 and the second imaging processing pipeline 250, respectively, in conjunction with the white balance gain lookup tables 227, 232. Memory 212 contains light source or color temperature dependent lookup tables (LUTs) for the first camera unit 201 including white balance gain LUT 227, color correction matrix (CCM) LUT 228 and color saturation LUT 229. Likewise for the second camera unit 202, the memory 212 contains white balance gain LUT 232, CCM LUT 233 and color saturation LUT 234. These LUTs may be stored individually, or may be integrated into a single LUT per camera unit in some embodiments. In some embodiments, the common white balance results 231 may also be used to adjust the color correction matrix 209 components and/or to the color saturation 215 components of each of the two image signal processing pipelines using the appropriate LUTs from memory 212. The image signal processing pipeline components may access the memory 212 using a memory interface 226.

In an example of adjusting the white balance gain using the common white balance results 231, the multi-camera AWB synchronization logic 230 may provide correction factors to the white balance gain 207 components by determining an illuminant color temperature resulting in R/G and B/G white balance gain scaling factors. Therefore correction factors may be sent for the first camera unit 201 that consist of an R/G and B/G correction factor and likewise, correction factors for the second camera unit 202 that consist of an R/G and B/G correction factor. Thus an example of correction for the first camera unit 201 is R/G Gain1=[(R/G)wb×(R/G)unit 1] and B/G Gain1=[(B/G)wb×(B/G)unit 1]. Similarly in an example for the second camera unit 202, the correction is R/G Gain2=[(R/G)wb×(R/G)unit 2] and B/G Gain2=[(B/G)wb*(B/G)unit 2]. More particularly, the multi-camera AWB synchronization logic 230 may change or adjust the (R/G)wb and (B/G)wb correction factors for one or both of the cameras based on the common white balance results 231 or may include the correction factors as part of the common white balance results 231 provided to the white balance gain 207 components.

In accordance with the embodiments, the multi-camera AWB synchronization logic 230 will receive the individual camera unit white balance results 224, 225 per camera as input from the corresponding first and second camera unit auto white balance routines 222, 223 which use the corresponding camera unit calibration data and image color statistics. White balance synchronization is achieved by using a voting mechanism to select one set of camera unit white balance results, excluding any camera-unit-specific results, to be the common white balance results 231. The common white balance results 231 are then used along with the unit calibration data 204, 214 of each camera to determine the white balance gain and also, in some embodiments, the color correction matrix (CCM), and the color saturation per image.

Figure 3:
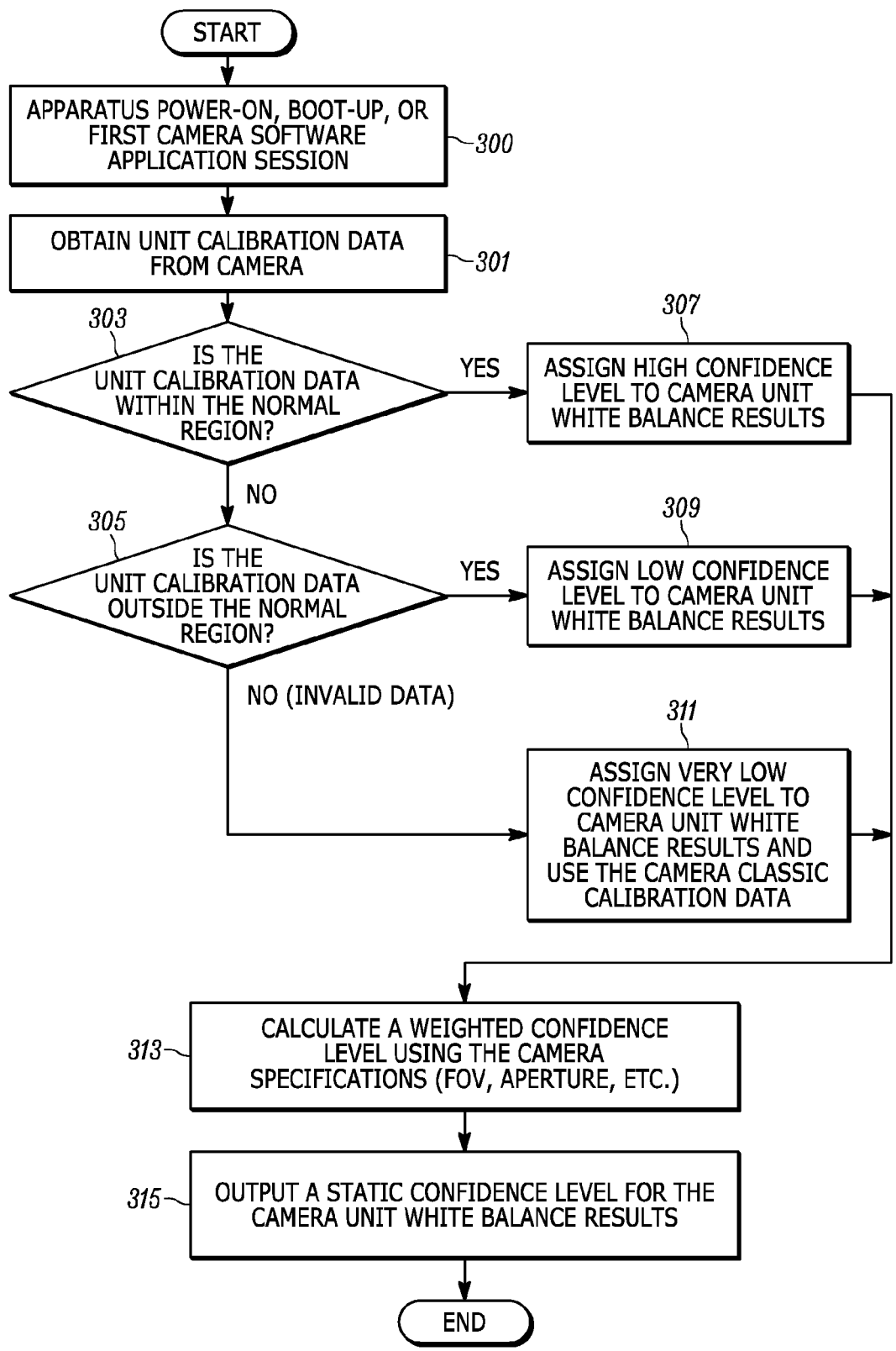
FIG. 3 is a flow chart illustrating a process for determining a static confidence level for camera unit white balance results in accordance with various embodiments.
Figure 4:
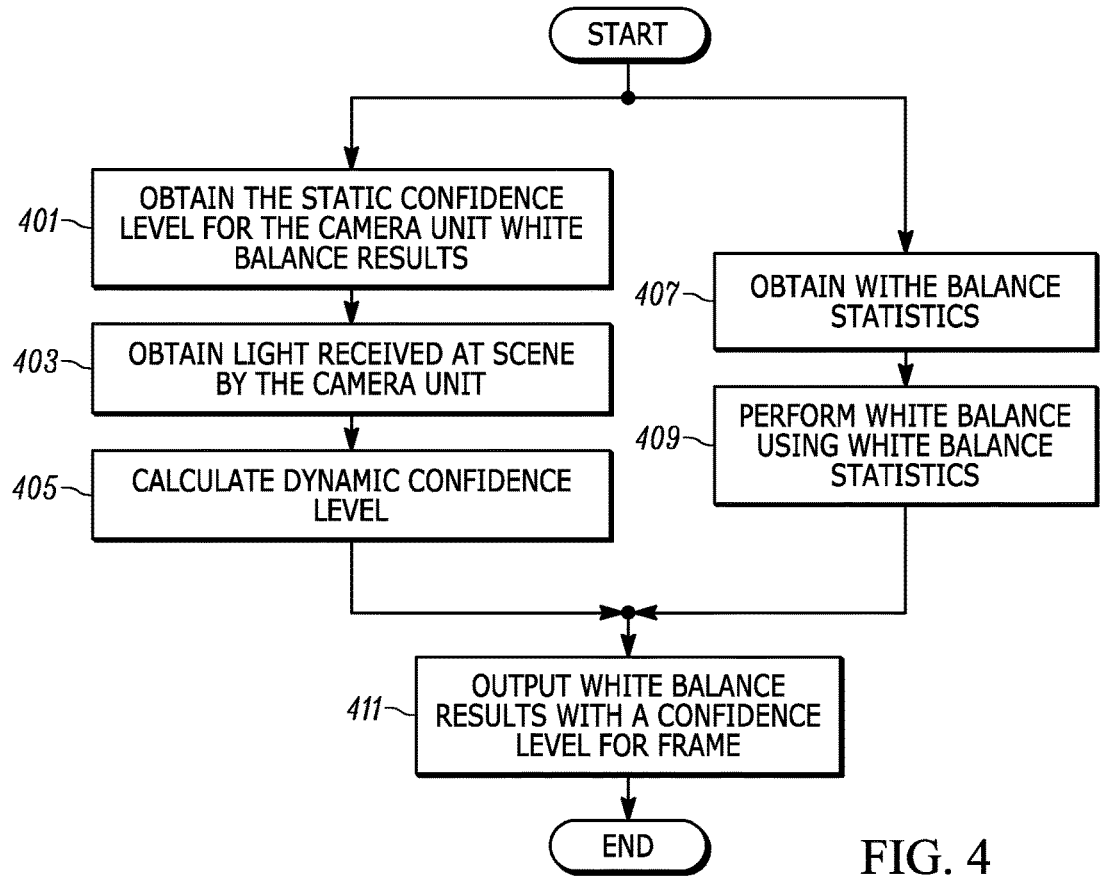
FIG. 4 is a flow chart illustrating a process for determining camera unit white balance results with a confidence level in accordance with various embodiments.
Figure 5:
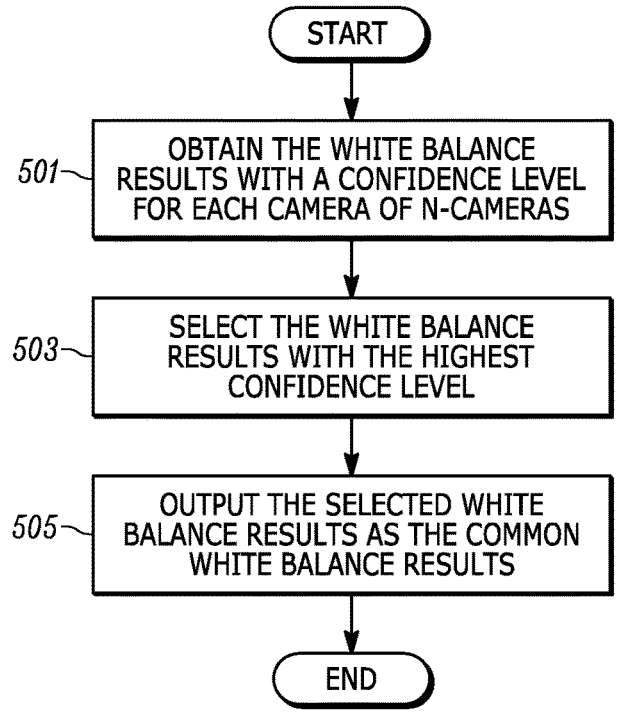
FIG. 5 is a flow chart illustrating a process for determining common white balance results for a plurality of cameras in accordance with various embodiments.

One example of a voting mechanism used by the multi-camera AWB synchronization logic 230 to achieve white balance synchronization is illustrated by the processes shown in FIG. 3 through FIG. 5. As discussed above, each camera, first camera unit 201 and second camera unit 202, has its own color calibration data which is contained in the unit calibration data 204 and unit calibration data 206, respectively. From image color statistics data collected from thousands of cameras, a distribution of unit calibration data may be established and this information may be stored in memory for access by the multi-camera AWB synchronization logic 230. Using this distribution information, the multi-camera AWB synchronization logic 230 can identify if a given camera's unit calibration data is within a normal region or if it is outside the normal region and is within an outlier region of the distribution. That is, if the unit calibration data of one camera is located in the outlier region, then it implies a higher difficulty to generate accurate individual camera unit white balance results. Also, for every model of camera unit, calibration data from its golden reference unit is available (i.e. the "classic" calibration data). If any camera's unit calibration data becomes corrupted, the classic calibration data will be used as a substitute.

Referring to FIG. 3 through FIG. 5, the processes include determining a confidence level per camera unit independently, without any influence from any other camera unit. The voting mechanism then determines a final result based on the highest determined confidence level. Beginning in FIG. 3, a process for determining a static confidence level for the first camera unit white balance results 224 and the second camera unit white balance results 225 in accordance with various embodiments is illustrated. The processes illustrated in FIG. 3 through FIG. 5 are applicable to the apparatus 100 illustrated in FIG. 1 as well as to the apparatus 200 illustrated in FIG. 2. However, for convenience of explanation the processes will be described with respect to dual image signal processing pipelines such as in the example shown in FIG. 2 with the understanding that the described processes may be extended to any number of camera units and to any number of image signal processing pipelines.

Turning to FIG. 3, in operation block 300, the process begins when the apparatus is powered-on or boots up, or when a first session of a camera software application is initiated. The multi-camera AWB synchronization logic 230 proceeds to obtain unit calibration data from one of the cameras as shown in operation block 301. It is to be understood that the process of FIG. 3 is performed for both the first camera 201 and the second camera 202 in the same manner and not on a frame-by-frame basis, so the confidence level assigned in FIG. 3 is called a static confidence level. In decision block 303, the multi-camera AWB synchronization logic 230 checks to see whether the camera's unit calibration data is within the normal region of the calibration data distribution that was discussed above previously. If yes, then the multi-camera AWB synchronization logic 230 assigns a high confidence level to the camera unit's white balance results as shown in operation block 307. The process then proceeds to operation block 313 in which a weighted confidence level is calculated for that camera unit's white balance results, using the camera's specifications which may include, among other things, FOV, aperture, etc. In operation block 315, the multi-camera AWB synchronization logic 230 generates a static confidence level for the given camera unit white balance results and the process of FIG. 3 ends as shown.

If the multi-camera AWB synchronization logic 230 determines that the unit calibration data is not within the normal region in decision block 303, then the multi-camera AWB synchronization logic 230 determines whether the calibration data is outside the normal region as shown in decision block 305. If the unit calibration data is outside the normal region, then the multi-camera AWB synchronization logic 230 assigns a low confidence level to that camera unit's white balance results as shown in operation block 309. The process then proceeds to operation block 313 and operation block 315. However, if the calibration data is found to be invalid (in other words corrupted) then, in operation block 311, the multi-camera AWB synchronization logic 230 will assign a very low confidence level to the camera unit's white balance results and will use the classic calibration data. The process then proceeds to operation block 313 and operation block 315, and a static confidence level for the given camera unit white balance results is determined. As noted above, the process of FIG. 3 is performed for both the first camera unit 201 and second camera unit 202 only once at power-up or booting of the apparatus, or at the beginning of a session of the apparatus camera software application in some embodiments.

The multi-camera AWB synchronization logic 230 then continues with the process illustrated by the flowchart of FIG. 4. In operation block 401, the multi-camera AWB synchronization logic 230 obtains the static confidence level determined for the given camera unit's white balance results and, in operation block 403, obtains the light received at the scene by the given camera unit image sensor 112 as a luminance value. The multi-camera AWB synchronization logic 230 then calculates the dynamic confidence level in operation block 405. In operation block 407, the first camera unit AWB routine 222 and the second camera unit AWB routing 223 obtain statistics 208, 210, respectively, from the image signal processing pipelines 240, 250, and in operation block 409 perform an auto white balance operation to determine the light source at the scene. The multi-camera AWB synchronization logic 230 then determines the confidence level for the individual camera unit white balance results 224, 225 for the frame in operation block 411 and the process ends as shown. The process of FIG. 4 is performed for both the first camera unit 201 and second camera unit 217 on a frame-by-frame basis.

The multi-camera AWB synchronization logic 230 then continues with the process illustrated in FIG. 5. In operation block 501 the multi-camera AWB synchronization logic 230 obtains the first camera unit white balance results 224 with a first confidence level and obtains the second camera unit white balance results 225 with a second confidence level. It is to be understood that this would be done for each camera unit in an n-camera apparatus; however the present example involves a two camera apparatus 200. In the example apparatus 200, the multi-camera AWB synchronization logic 230 will therefore obtain camera unit white balance results 224 for the first camera unit 201 and camera unit white balance results 225 for the second camera unit 202, where each of the independent camera unit white balance results has an associated confidence level. In operation block 503, the multi-camera AWB synchronization logic 230 selects the camera unit white balance results with the highest confidence level and, in operation block 505, outputs the selected camera unit white balance results, but excluding any camera-unit-specific results, as the common white balance results 231 which is then used for all camera units. The process then ends as shown. The common white balance results 231 may then be provided to adjust white balance gains for one or both of the white balance gain 207 components of the image signal processing pipelines. The white balance gains may be adjusted by scaling the white balance gain obtained for the given camera unit based on its respective unit calibration data and light received at the scene. The common white balance results 231 may also be provided to adjust color correction matrix for one of the color correction 209 component of the image signal processing pipelines. The image processing pipeline 240 and image processing pipeline 250 then proceed to process the image frame to produce the output frames with synchronized color such that a final image may be produced.

Figure 6:
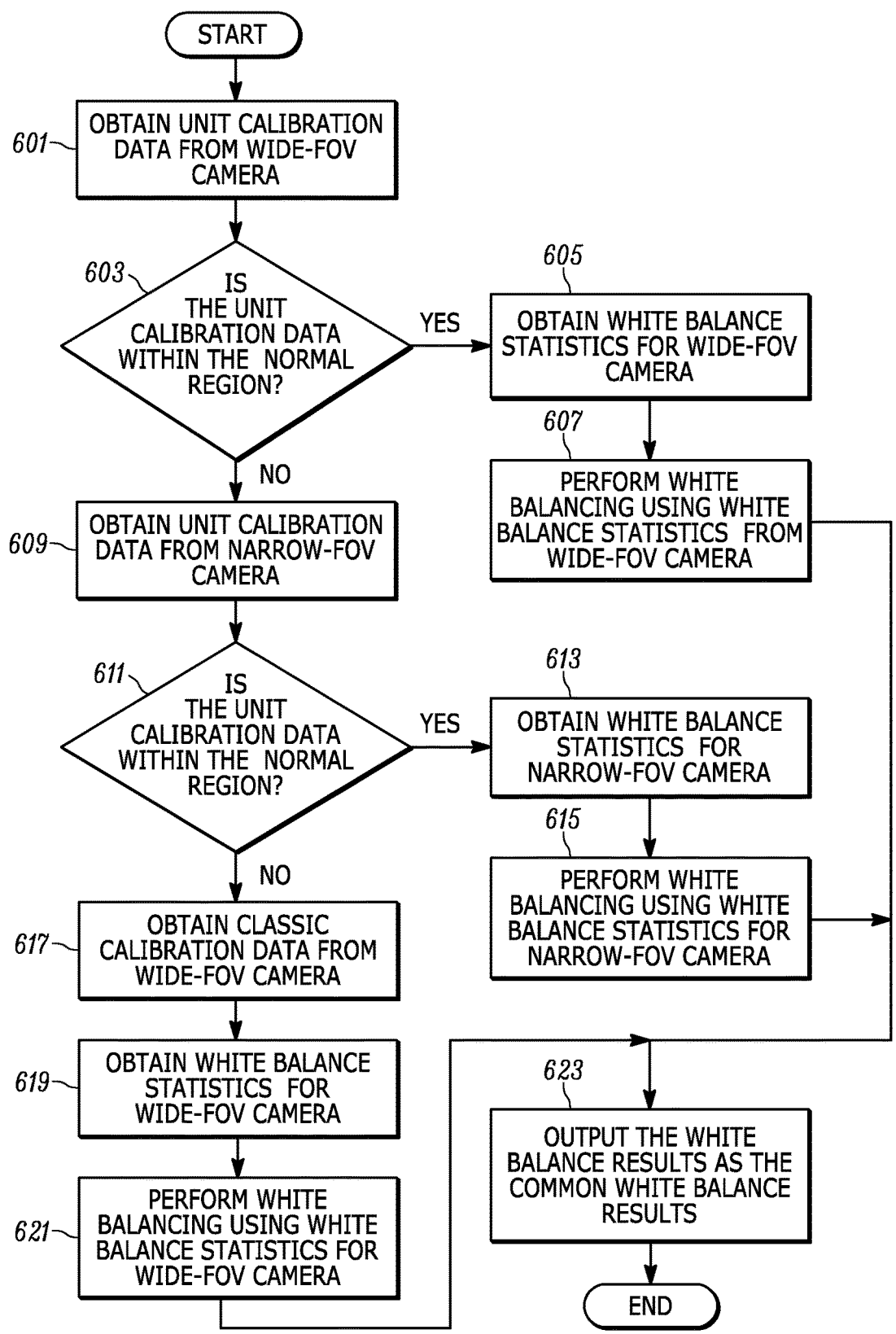
FIG. 6 is a flow chart illustrating a process for determining common white balance results for a dual camera apparatus having a wider field-of-view camera unit and a narrower field-of-view camera unit in accordance with various embodiments.

Therefore the details of operation of the multi-camera AWB synchronization logic 230 have been described and illustrated by the processes of FIG. 3 through FIG. 5. An operation of the multi-camera AWB synchronization logic 230 in some embodiments is illustrated by FIG. 6. FIG. 6 is a flow chart illustrating a process for determining common white balance results for a dual camera apparatus having a wide field-of-view camera and a narrow field-of-view camera in accordance with various embodiments. Although the following description will be limited to a dual-camera scenario, it is to be understood that the process may be applied to an apparatus having any number of cameras. The process may be applied to predetermined pairs of cameras, to various combinations of pairs, or iteratively all cameras of the apparatus when paired with every other camera, etc.

More particularly in FIG. 6, a voting mechanism is performed for every two cameras. The cameras may be sorted by using their specifications, for example, using the camera FOV (field-of-view) or some other characteristic. The first two cameras are compared by using their unit calibration data quality and/or adding light received at a scene. One camera unit's white balance results, excluding any camera-unit-specific results, will be selected as the common white balance results by using, for example, the processes described with respect to FIG. 3 through FIG. 5. Subsequently, this camera unit and another camera unit may be compared for n-camera units in an n-camera unit apparatus. Only one winner camera unit white balance result will be selected at each comparison step. At the end of the comparison process, only one camera unit white balance results will be selected, excluding any camera-unit-specific results, and used as the common white balance results for all other camera units of the apparatus.

For purposes of simplifying the explanation of the FIG. 6 process, the first camera unit 201 will be assumed to be a wide FOV camera and the second camera unit 202 will be assumed to be a narrow FOV camera. The process begins and, in operation block 601, the multi-camera AWB synchronization logic 230 obtains the unit calibration data 204 from the wide FOV camera, for example first camera unit 201. In decision block 603, the multi-camera AWB synchronization logic 230 checks the unit calibration data 204 for the first camera 201 against the calibration data distribution to determine if the unit calibration data 204 is within the normal region. If yes, then the first camera unit AWB routine 222 obtains the statistics 208 for the wide FOV camera in operation block 605. In operation block 607, the first camera unit AWB routine 222 performs the AWB operation using the white balance statistics 208 for the wide FOV camera and using the unit calibration data 204 and provides the first camera unit white balance results 224 as input to the multi-camera AWB synchronization logic 230. The process then continues in operation block 623 and the multi-camera AWB synchronization logic 230 uses the first camera unit white balance results 224 (i.e. wide FOV camera white balance results) as the common white balance results 231, but excluding any camera-unit-specific results in 224. The process then ends as shown.

If the unit calibration data for the wide FOV camera is not within the normal region in decision block 603, then the second camera unit AWB routine 223 obtains the unit calibration data 214 from the second camera unit 202 (i.e. the narrow FOV camera) in operation block 609. If the unit calibration data 214 from the narrow FOV camera is within the normal region in decision block 611, then the second camera unit AWB routine 223 obtains the white balance statistics 210 for the narrow FOV camera in operation block 613. In operation block 615, the second camera unit AWB routine 223 performs the AWB operation using the white balance statistics 210 for the narrow FOV camera and the unit calibration data 206 from the second camera unit 202 which is the narrow FOV camera. The multi-camera AWB synchronization logic 230 then uses the second camera unit white balance results 225 (i.e. the narrow FOV camera unit white balance results) as the common white balance results 231, but excluding any camera-unit-specific results in 225, as shown in operation block 623 and the process ends.

If the narrow FOV camera unit calibration data is outside the normal region in decision block 611, then the first camera unit AWB routine 222 will obtain the classic calibration data from the wide FOV camera (i.e. the first camera unit 201) in operation block 617. In operation block 619, the first camera unit AWB routine 222 will obtain the white balance statistics 208 for the wide FOV camera and, in operation block 621, will perform the AWB operation to determine the light source at the scene using the white balance statistics 208 for the wide FOV camera along with the wide FOV camera classic calibration data. The multi-camera AWB synchronization logic 230 will then use the wide FOV camera white balance results 224, but excluding any camera-unit-specific results, as the common white balance results 231 in operation block 623 and the process ends.

In some embodiments, the wide FOV white balance results may be weighted higher than the narrow FOV camera white balance results because the wider FOV will naturally capture more of a given scene. However, alternatively or in conjunction with FOV, other camera unit factors such as, but not limited to, faster lenses may also be given greater weight where a faster lens refers to, for example, a larger aperture for a fixed effective focal length (EFL). A camera with a larger aperture may receive more light at the same scene, compared to a camera with a smaller aperture.

In some embodiments, to measure the color difference between white balanced and color corrected image frames of multiple cameras, further statistics may be collected for the overlapping regions on multiple image frames. The statistics is used to evaluate the effectiveness of the multi-camera AWB synchronization. The statistics of the overlapping region may be collected on a white balanced and color corrected image frame per camera unit, at any location in the pipelines after the color correction matrix 209. Further, in embodiments having n-cameras the calibration of the alignment may be used by a new color statistics collection logic, located after the color correction 209 in the image signal processing pipelines 240 or 250, to determine a left top coordinate and a right bottom coordinate of an image window from which to collect statistics. In other words, the statistics may be collected from overlapping regions of the various camera unit views only and the rest of the image may be ignored to conserve processing. This approach may be performed by finding the overlapping regions of all n-camera units, or may be done on a combination of camera unit basis, such as for every two cameras, etc. Therefore, in some embodiments, the above described second statistics capture may be performed after frame alignment such as after stereo matching, dynamic pixel offset, stereo rectification (such as distortion correction or perspective correction), etc. have been applied.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:
1. An apparatus, comprising:
a plurality of camera units, each camera unit comprising a lens and a sensor operative to detect at least three colors;

camera unit calibration data for each camera unit, the camera calibration data stored in non-volatile, non-transitory memory; and multi-camera auto white balance synchronization logic, operatively coupled to each camera unit, operative to:
determine whether a camera unit calibration data is within a given camera calibration data region by comparing the camera unit calibration data for each camera unit to a distribution of camera unit calibration data, and
determine common white balance results for the plurality of camera units based on camera unit white balance results per frame of each camera unit and based on determining whether the camera unit calibration data is within the given calibration data region to provide white balance and color correction to one or more frames such that a merged frame can be obtained by combining the frames of each camera unit.

2. The apparatus of claim 1, further comprising:
a plurality of image processing pipelines, each image processing pipeline operatively coupled to a corresponding camera unit of the plurality of camera units and to the multi-camera auto white balance synchronization logic, each image processing pipeline operative to output a white balanced and color corrected frame based on the common white balance results.

3. The apparatus of claim 2, wherein the multi-camera auto white balance synchronization logic is further operative to:
assign a first confidence level to camera unit white balance results of each camera unit; and
calculate a weighted confidence level for the camera unit white balance results for each camera unit.

4. The apparatus of claim 3, wherein the multi-camera auto white balance synchronization logic is further operative to:
determine a second confidence level for each frame captured by each camera unit based on light received by each camera unit in capturing the frame; and
perform white balancing and color correction for each frame of each camera unit using statistics to generate camera unit white balance results with the second confidence level for each frame of each camera unit.

5. The apparatus of claim 4, wherein the multi-camera auto white balance synchronization logic is further operative to:
select the camera unit white balance results with the highest confidence level where the camera unit white balance results are for a first camera unit of the plurality of camera units; and
provide the camera unit white balance results with the highest confidence level, excluding any camera-unit-specific results, as the common white balance results to the image processing pipeline of every other camera unit other than the first camera unit.

6. The apparatus of claim 3, wherein the multi-camera auto white balance synchronization logic is further operative to:
calculate the weighted confidence level for the camera unit white balance results for each camera unit wherein the weighted confidence level is increased based on field-of-view or lens aperture.

7. The apparatus of claim 3, wherein a new color statistic collection logic is further operative to:
determine overlapping regions of the image for each frame captured by each camera unit; and
collect statistics only for the overlapping regions of each frame.

8. The apparatus of claim 7, wherein a new color statistic collection logic is further operative to:
use alignment calibration of the camera units to determine coordinates for obtaining statistics for overlapping regions of each frame.

9. A method comprising:
obtaining statistics from frames of each camera unit of a plurality of camera units where each frame comprises at least three colors;
determining whether a camera unit calibration data is within a given camera calibration data region by comparing the camera unit calibration data for each camera unit to a distribution of camera unit calibration data, and
determining common white balance results based on camera unit white balance results per frame and based on determining whether the camera unit calibration data is within the given calibration data region for each camera unit of the plurality of camera unit; and
producing a merged frame by combining the frames of each camera after white balance and color correction of each frame using the common white balance results.

10. The method of claim 9, further comprising:
outputting, by a plurality of image processing pipelines, a white balanced and color corrected frame based on the common white balance results.

11. The method of claim 10, further comprising:
assigning a first confidence level to the camera unit white balance results of each camera unit; and
calculating a weighted confidence level for the camera unit white balance results for each camera unit.

12. The method of claim 11, further comprising:
determining a second confidence level for each frame captured by each camera unit based on light received by each camera unit in capturing the frame; and
performing white balancing and color correction for each frame of each camera unit using statistics to generate camera unit white balance results with the second confidence level for each frame of each camera unit.

13. The method of claim 12, further comprising:
selecting the camera unit white balance results with the highest confidence level where the camera unit white balance results are for a first camera unit of the plurality of camera units; and
providing the camera unit white balance results with the highest confidence level, excluding any camera-unit-specific results, as the common white balance results to the image processing pipeline of every other camera unit other than the first camera unit.

14. The method of claim 11, further comprising:
calculating the weighted confidence level for camera unit white balance results for each camera unit wherein the weighted confidence level is increased based on field-of-view or lens aperture.

15. The method of claim 11, further comprising:
determining overlapping regions of the image for each frame captured by each camera unit; and
collecting statistics only for the overlapping regions of each frame.

16. The method of claim 15, further comprising:
using alignment calibration of the camera units to determine coordinates for obtaining statistics for overlapping regions of each frame.

17. An apparatus comprising:
a plurality of camera units, each camera unit comprising a lens and a sensor operative to detect at least three colors and non-volatile, non-transitory memory storing camera unit calibration data;
at least one processor, operative to determine camera unit white balance results for each camera unit of the plurality of camera units; and
multi-camera auto white balance synchronization logic, operatively coupled to each camera unit and to the at least one processor, operative to:
apply confidence levels to the unit calibration data of each camera unit;
apply confidence levels to the camera unit white balance results for each camera unit of the plurality of camera units; and
select one camera unit's white balance results, excluding any camera-unit-specific results, as a common white balance result to adjust white balance gains and color correction matrices for the plurality of camera units.

18. The apparatus of claim 17, further comprising:
statistical distribution information for unit calibration data stored in non-volatile, non-transitory memory; and
wherein the multi-camera auto white balance synchronization logic is operative to apply confidence levels to the unit calibration data of each camera unit using the statistical distribution information for unit calibration data.

19. The apparatus of claim 17, wherein the multi-camera auto white balance synchronization logic is further operative to:
determine white balance gain correction factors for each camera unit of the plurality of camera units.

20. The apparatus of claim 19, wherein the at least one processor is further operative to:
adjust a plurality of white balance gain determinations using the white balance gain correction factors for each camera unit of the plurality of camera units.

* * * * *